United States Patent [19]
Thieben et al.

[11] Patent Number: 6,080,817
[45] Date of Patent: *Jun. 27, 2000

[54] EPOXY-URETHANE IMINE AND HYDROXYL PRIMER

[75] Inventors: Larry E. Thieben, Waterville; Patrick J. Mormile, Bowling Green; Bradley M. Richards, Maumee, all of Ohio; Rajnikant Shah, Ahmedabad, India

[73] Assignee: BASF Corporation, Southfield, Mich.

[ * ] Notice: This patent is subject to a terminal disclaimer.

[21] Appl. No.: 08/987,093

[22] Filed: Dec. 8, 1997

[51] Int. Cl.7 .............................. C08L 63/02; C08L 67/02
[52] U.S. Cl. ............................ 525/111; 525/438; 525/528
[58] Field of Search ..................................... 525/528, 111, 525/438

[56] References Cited

U.S. PATENT DOCUMENTS

| | | | |
|---|---|---|---|
| 3,993,708 | 11/1976 | Brinkmann et al. | 260/830 P |
| 4,433,078 | 2/1984 | Kersten et al. | 523/404 |
| 5,214,086 | 5/1993 | Mormile | 524/237 |

*Primary Examiner*—Robert Dawson
*Assistant Examiner*—D. Aylward

[57] ABSTRACT

The present invention is directed to novel coating compositions. In particular, the present invention is directed to polyuroxy low VOC coating compositions. The compositions may be applied wet on wet with a suitable basecoat/clearcoat or single-stage topcoat composition.

7 Claims, No Drawings

6,080,817

EPOXY-URETHANE IMINE AND HYDROXYL PRIMER

FIELD OF THE INVENTION

The present invention is directed to novel coating compositions. In particular, the present invention is directed to polyuroxy coating compositions that comprise an epoxy, imine, isocyanate and an active hydrogen compound or an active hydrogen containing compound.

BACKGROUND OF THE INVENTION

With increasing Volatile Organic Content (VOC) restrictions, it is difficult to get a balance of pot life and dry time for coatings useful in refinish paint compositions. The main problems have been that the hydroxyl functional polyols are generally high molecular weight resins, which are viscous materials and require a lot of organic solvents in order to reduce to sprayable viscosities. It is also difficult to get the VOC low enough to be compliant with environmental restrictions. By using reactive diluents in combination with the polyol and isocyanates, lower VOC can be achieved. An excellent example of this type coating is exemplified in U.S. Pat. No. 5,214,086 and is assigned to BASF Corporation.

In the prior art, the use of diketimines, dialdimines, and hindered diamines as reactive diluents, helps to lower the viscosity and increase the solids, thus enabling coating compositions to reach required VOC limits. However, as more stringent VOC limits are being set, it has become necessary to try and achieve even lower VOCs. The use of low molecular weight hydroxyl functional polyols are difficult to use in order to reach these VOC limits. In addition, these polyols react too fast and a sufficient pot life is difficult to achieve.

An approach to a coating composition has been to mix epoxy/amine reactants with hydroxyl/isocyanate reactants, but the amine used for the epoxy reaction reacts exceedingly fast with the isocyanate leaving only an epoxy group and an hydroxyl group which do not react under ambient conditions.

We have now found that polyuroxy coating compositions overcome the prior art disadvantages and result in low VOC coatings that are especially useful as refinish paint compositions.

The present invention is directed to novel coating compositions. In particular, the present invention is directed to coating compositions that comprise epoxy, imine, isocyanate and active hydogen containing compound.

SUMMARY OF THE INVENTION

The present invention relates to the use of polyurea/epoxy-urethanes in coating systems especially coatings suitable for the production of paint for the Automotive industry. The coatings can be cured at ambient conditions or can be cured by baking and are therefore useful in refinish paint compositions. The coating composition optionally contains pigments and other well known paint additives such as fillers, rheology control agents, dispersing agents, solvents, etc.

The coating composition comprises:
  a) at least one epoxy functional compound;
  b) an imine functional compound
  c) at least one isocyanate functional resin and optionally an active hydrogen containing compound.
  d) an active hydrogen containing compound.

The coating composition can be low in volatile organic content (VOC), but the invention is not limited to only low VOC compositions. The invention also relates to the reaction behavior of the coating composition being moisture dependent, but moisture is not essential for the reaction. The invention also relates to optionally using catalysts to accelerate the reaction rate of the secondary amine and aldimine compounds with isocyanate compounds. The catalysts used in this invention are aromatic or aliphatic carboxylic acids, arylsulfonic acids or organic tin compounds, as described in the cited prior art. The use of moisture scavengers is optional in order to control the reaction rates in humid conditions.

DETAILED DESCRIPTION OF THE INVENTION

The present invention relates to the use of polyurea/epoxy-urethanes in coating systems especially coatings suitable for the production of paint for the Automotive industry. The coatings can be cured at ambient conditions or can be cured by baking and are therefore useful in refinish paint compositions. The coating composition optionally contains pigments and other well known paint additives such as fillers, rheology control agents, dispersing agents, solvents, etc.

The coating composition comprises:
  a) at least one epoxy functional compound;
  b) an imine functional compound
  c) at least one isocyanate functional resin and optionally
  d) an active hydrogen containing compound.

This invention also describes a method for reducing the volatile organic content (VOC) of a paint composition, by increasing the solids in a paint composition without adversely affecting the application, durability or performance of the composition.

Useful epoxy compounds are those which react with amine functional compounds under ambient or bake conditions.

Useful isocyanates are di- or polyisocyanates which are aliphatic, cycloaliphatic, or aromatic. Such isocyanates include hexamethylene diisocyanate, 1-methyl-2,4-diisocyanatocyclohexane, isophorone diisocyanate,4,4-diisocyanatodicyclohexyl methane, toluene-2-4-diisocyanate, o-, m-, and p-xylene diisocyanate, 1-5-naphthalene diisocyanate, isocyanates or mixtures thereof. It is also possible to use polyisocyanates with isocyanurtes, allophanate or uretdione structures. The polyisocyanates may optionally be reacted with a deficit of polyhydroxy compounds, such as water, glycols, polyalkylene glycols, neopentyl glycols, glycerol, trimethylol propane, hexane triol, or alkyd resins, before being used.

This invention also relates to a process of formulating coatings by using aldimine and ketimine. Typically, the aldimine does not completely hydrolyses into amine and aldehyde, but probably reacts with the isocyanate as the amine. Useful hydroxyl containing compounds acrylic polyols, polyester polyols and those known to the prior art.

The composition may also contain pigments. These pigments can be introduced by first forming a mill base with the epoxy functional compound or optionally with the imine by conventional techniques, such as sand grinding, ball milling, attritor grinding, or two roll milling to disperse the pigments. The mill base is blended with the film forming constituents as shown in the examples which follow.

The invention also relates to optionally using catalysts to accelerate the reaction rate of the epoxy imine and imine compounds with isocyanate compounds. The catalysts which may be used in this invention are organic tin compounds, organic acids, or inorganic acids.

The use of moisture scavengers is optional in order to control the reaction rates in humid conditions.

The use of moisture scavenging materials is optional in this application in order to control the water which is released from the pigments, especially in grinding. The removal of this water in the mill base helps to control the reaction rates of the coating composition and allow for the desired properties of the coating film.

Coating compositions described by the present invention find utility in application of ambient film forming and curing such as automotive refinish coatings. It is also suggested that the present invention applied to coatings to be force dried or baked to accelerate the coating curing process. Forced dry conditions range from 100 degrees Fahrenheit to over 325 degrees Fahrenheit. The coating cure process for the present invention may also be accelerated by the utilization of radiant heating or Infra Red emitting devices known to the art.

The following examples are intended to illustrate the invention. All quantities are shown on a weight bases unless otherwise indicated.

The following epoxy-isocyanate-imine-hydroxyl (polyuroxy) primer systems were made and achieved a 3.1 lbs. VOC or less and exhibited excellent adhesion, humidity resistance, salt spray resistance and chip resistance. The specific vehicle composition is listed in the following Examples:

EXAMPLE 1

| | % by weight |
|---|---|
| Epoxy Resin (Dow DER 663U) | 21.8 |
| Butyl Benzyl Phthalate (Monsanto Santicizer 160) | 5.7 |
| Ketimine Resin (Akzo Setalux K (7002 bX-55) | 9.7 |
| Hydroxyl Acrylic Resin (BASF BASF Acrylic Resin) | 22.9 |
| Isocyanurate Trimer of (Rhone-Poulenc Tolonate HDT) | 39.9 |
| | 100.0 |

EXAMPLE 2

| | % by weight |
|---|---|
| Epoxy resin (SHELL Epon 1001-X-75) | 16.8 |
| Epoxy ester resin (BASF Epoxy Ester) | 14.5 |
| Ketimine (BAYER LS-2965) | 33.1 |
| Isocyanate Trimer (RHONE-POULENC Tolonate HDT-LV) | 9.6 |
| Isocyanate Trimer (BAYER N-3400) | 26.0 |
| | 100.0 |

We claim:

1. A primer coating composition comprising the reaction product of:
   (A) at least one epoxy functional compound comprising the polymer of epoxy resin and bisphenol A,
   (B) at least one imine functional compound,
   (C) a hardener comprising at least one di- or polyisocyanate functional resin, and
   (D) an active hydrogen containing compound selected from the group consisting of polyester polyols and acrylic polyols.

2. The composition of claim 1 which is cured at ambient temperatures.

3. The composition of claim 1 which is baked to cure.

4. The composition of claim 1 that additionally contains at least one pigment.

5. The composition of claim 1 wherein the isocyanate functional resin is selected from the group consisting of aliphatic, aromatic and cycloaliphatic di-isocyanates, triisocyanates, uretdiones, biurets and isocyanurates thereof and mixtures thereof.

6. The composition of claim 5 wherein the isocyanate functional resin is a dimer or trimer of hexamethylene diisocyanate or a blend of both.

7. The composition of claim 1 wherein the epoxy functional compound is selected from the group consisting of (a) the reaction product of (i)phenol 4,4'-(1-methylethylidene) bispolymer with (ii) 2,2'-[1-methyl ethylidene bis(4,1-phenylene oxymethylene)]bis oxirane; and (b) a cycloaliphatic epoxide having the formula bis(3,4-epoxycyclohexyl)adipate.

* * * * *